Patented May 22, 1945

2,376,823

UNITED STATES PATENT OFFICE 2,376,823

COATING COMPOSITION AND METHOD OF PRODUCING

Paul H. Scrutchfield, Hopewell, Va., assignor to Hercules Powder Company, Wilmington, Del., a corporation of Delaware No Drawing. Application June 26, 1942, Serial No. 448,679

20 Claims. (Cl. 260—22)

This invention relates to coating compositions and to a method for their production, and more particularly to improved coating compositions containing modified rosin esters and to a method for their production.

In my application for U. S. Letters Patent, Serial No. 413,479, filed October 3, 1941, now U. S. Patent 2,331,805, and entitled "Synthetic resin and process of producing the same," I have described the preparation of a novel and very desirable synthetic resin comprising a reaction product of an alcohol and a conjoint condensation product of a rosin or rosin ester, an aldehyde, and an alpha, beta-unsaturated polycarboxylic acid. Such a resin may be prepared, for example, by reacting suitable proportions of N wood rosin, formalin, and maleic anhydride in benzene solution to form a conjoint condensation product, which may then be esterified with glycerol to form a hard resin. These resins are possessed of a very high melting point and other desirable properties which make them very advantageous for a variety of uses.

Now, in accordance with this invention, I have discovered an improved coating composition which contains as the resin constituent a reaction product of a polyhydric alcohol and a conjoint condensation product of the simultaneous reaction of a mixture consisting essentially of a rosin, an aldehyde, and an alpha, beta-unsaturated polycarboxylic acid. Thus, these improved coating compositions comprise a drying or semidrying oil, a solvent, and a reaction product of a polyhydric alcohol and a conjoint condensation product of a rosin, an aldehyde, and an alpha, beta-unsaturated polycarboxylic acid. If desired, these coating compositions may also contain suitable driers and pigments. The coating compositions may be prepared in accordance with this invention by contacting a drying or semidrying oil and the aforementioned condensation product under conditions adapted to produce a composition of the desired properties, after which this composition may be diluted with a solvent to produce the finished coating composition. When the coating composition of this invention is prepared in accordance with this method, it is found that the composition will body in a short kettling period and that the finished coating composition is characterized by a rapid drying rate and by other very advantageous properties.

Having thus indicated in a general way the nature of this invention, the following examples are offered to illustrate the preparation of the novel coating compositions which contain as a resin ingredient a reaction product of a polyhydric alcohol and a condensation product of a rosin, an aldehyde, and an alpha, beta-unsaturated polycarboxylic acid. In the specification and in the claims, the parts and percentages are by weight unless otherwise indicated.

Example I

Eight hundred parts of polymerized rosin (polymerized in solution in benzene by means of 100% sulfuric acid and having a drop melting point of 98° C.) were dissolved in benzene to form a solution having a solids content of 60%, and 75 parts of formaldehyde (as 35.6% formalin) and 43.75 parts of maleic anhydride added. The emulsion thus formed was vigorously agitated and then refluxed for 5–7 hours at 75–85° C. After distilling off the volatile components from the mixture, the condensate obtained was heated to 240° C. and held there for 30 minutes under a pressure of 15 mm. of mercury. This condensate was then esterified with 11 parts of pentaerythritol per 100 parts of condensate at 285–295° C. until no further decrease in the acid number of the resin was observed. This required that the esterification be conducted for a period of about 16 hours. After the esterification was complete, a resin having a drop melting point of 194° C., an acid number of 14.5 and a color of E— (U. S. Standard) was provided. Two hundred fifty parts of this finished resin and 500 parts of Z4 bodied linseed oil were heated to 585° F. in 1 hour and held at that temperature for 33 minutes. The mixture was then allowed to cool to 475° F. and was thinned with mineral spirits having a boiling range of about 300–400° F. to a solution containing 50% solids. A varnish having a Gardner-Holdt viscosity of H and a Hellige color of 7L was obtained. Naphthenate driers were added to this varnish to give 0.2% calcium, 0.1% lead, and 0.07% cobalt, based upon the weight of the oil. This varnish set "dust free" in 2 hours and 45 minutes and dried "tack free to aluminum foil" in 8½ hours.

Example 2

Two hundred fifty parts of a reaction product of glycerol and a conjoint condensation product of N wood rosin, formaldehyde, and maleic anhydride (prepared in a manner similar to that in which the resin employed in Example 1 was prepared and having a drop melting point of 183° C., an acid number of 15, and a color of K to M) and 125 parts of X bodied linseed oil were heated to 585° F. in 45 minutes and held at that temperature for 10 minutes, after which the mixture was checked with 375 parts of the same oil, thus reducing the temperature of the mixture to 320° F. The varnish was then reheated to 585° F. in 50 minutes and held at that temperature for 1 hour and 50 minutes. The mass was allowed to cool to 475° F. and thinned with mineral spirits to a solution containing 50% solids. The varnish had a Gardner-Holdt viscosity of E+ and a Hellige color of 4L. Naphthenate driers were added to give 0.2% calcium, 0.1% lead, and 0.07% cobalt, based upon the weight of the oil. This varnish dried "dust free" in 2 hours and 45 minutes and "tack free to aluminum foil" in about 8½ hours.

*Example 3*

Two hundred fifty parts of the resin employed in Example 2 and 100 parts of X bodied linseed oil were heated to 585° F. in 45 minutes and held at that temperature for 10 minutes. Four hundred parts of Z4 bodied linseed oil were then added and the temperature of the mixture fell to about 300° F. The temperature was raised to 585° F. in 50 minutes and held at that temperature for 5 minutes. The mass was then allowed to cool to 475° F. and thinned with mineral spirits to a solution containing 50% solids. The varnish obtained had a Gardner-Holdt viscosity of E+ and a Hellige color of 4. The same proportions of the same driers were added as were employed in the preceding examples, to provide a composition which dried "dust free" in 2 hours and 45 minutes and "tack free to aluminum foil" in 10 hours.

*Example 4*

Two hundred fifty parts of the resin employed in Example 2 and 400 parts of X bodied linseed oil were heated to 585° F. in 40 minutes and held at that temperature for 20 minutes, after which 100 parts of tung oil were added and stirred in well. The mass was then allowed to cool and was thinned with mineral spirits to provide a composition containing 50% solids. Driers were added as in the previous examples to provide a varnish which dried "dust free" in 2 hours and 15 minutes and "tack free to aluminum foil" in 6½ hours.

*Example 5*

A condensate was prepared in the manner described in Example 1 by refluxing 2000 parts of WW gum rosin, 1333 parts of benzene, 120 parts of maleic anhydride, and 514 parts of 36.5% formalin. One thousand six hundred seventeen parts of this condensate were esterified with 205 parts of pentaerythritol to give a resin having an acid number of 15, a drop melting point of 170° C., and a Lovibond color of 40 Amber+3.1 Red. A mixture containing 250 parts of this finished resin and 400 parts of Z2 viscosity heat-bodied dehydrated castor oil was heated in an inert atmosphere to 585° F. in 55 minutes and held at that temperature for a period of 50 minutes. The mixture was then cooled and reduced to 50% solids using mineral spirits. The varnish so prepared had a Gardner-Holdt viscosity of D and a color of 4 Hellige. Driers were added to this varnish as metal naphthenates using 0.5% lead and 0.05% cobalt based on the oil content. The varnish with driers when applied to glass and steel panels set to touch in 50 minutes, was "dust free" in 2 hours, and dried firm to aluminum foil in 5 hours.

The foregoing examples illustrates the preparation of the coating compositions of this invention by cooking a drying oil or semidrying oil and a reaction product of a polyhydric alcohol and a conjoint condensation product of a rosin, an aldehyde, and an alpha, beta-unsaturated polycarboxylic acid to form a varnish base, allowing the base to cool somewhat, and thereafter adding a suitable solvent. In the examples, the oil and resin were cooked at 585° F. Generally, any temperature between about 500 and about 620° F., and preferably between about 560 and about 600° F., will be found to be suitable for kettling the oil and the resin. In the examples, the kettling period varied from about 15 minutes to about 2 hours. The period of time which will be found to be most suitable for the kettling operation will depend upon the particular resin employed, the particular drying or semidrying oil selected, upon the kettling temperature, and upon other obvious factors. In general, a kettling period of from about 5 minutes to about 3½ hours is employed, and preferably the kettling period at 585° F is from about 15 minutes to about 1 hour. The kettling procedure shown in Example 2 is employed when very high melting point glycerol esters of rosin-formaldehyde-maleic anhydride condensates are heated with a linseed oil having a Gardner-Holdt viscosity greater than Z because it is found that the resin is incompatible with the linseed oil when the kettling procedure shown in Example 1 is used. This incompatibility may be overcome, as shown in Example 2, by precooking the resin with a small amount of linseed oil having a Gardner-Holdt viscosity between about X and about Z, and then cooking this mixture with sufficient oil of the desired viscosity to produce a varnish of the desired oil length. After the resin-oil combination has reached the desired degree of polymerization, it is usually allowed to cool to a temperature from about 400 to about 500° F. and is then thinned with a suitable solvent.

The resins suitable for use in the preparation of the coating compositions of this invention comprise the broad class of the reaction products of a polyhydric alcohol and a conjoint condensation product of a rosin, an aldehyde, and an alpha-, beta-unsaturated polycarboxylic acid. Such resins may be prepared from any polyhydric alcohol. Hence, in place of the resins prepared from glycol and pentaerythritol shown in the examples, there may be used in a resin prepared from ethylene glycol, diethylene glycol, triethylene glycol, propylene glycol, trimethylene glycol, dipentaerythritol, diglycerol, polyglycerol, polypentaerythritol, sorbitol, mannitol, etc.

Any rosin may be employed to prepare the reaction product which is used in the coating compositions covered by this invention. Thus, in place of the resin prepared from an N wood rosin shown in Example 2, there may be used a resin prepared from any wood or gum rosin, or the pure rosin acids contained therein, such as abietic acid, etc. Transformation products of any of these rosins may also be employed in the making of resins suitable for use in the preparation of the improved coating compositions. As such, there may be utilized partially hydrogenated rosins, prepared for example according to the method described in U. S. Patent 2,174,651 to Rollin J. Byrkit, Jr., and polymerized rosins. In Example 1, the polymerized rosin employed was polymerized by means of a sulfuric acid catalyst, but in its place there may be employed a polymerized rosin which has been polymerized with the aid of any of the other known polymerization catalysts, such as boron fluoride, aluminum chloride, etc. Heat treated rosins which have been heat treated at 250–350° C. for a period of time sufficient to produce substantial isomerization of the rosin, and disproportionated rosins which have been disproportionated by means of a hydrogenation catalyst, such as platinum, palladium, etc., may also be used in the preparation of the resins from which the coating compositions of this invention are made. The lower monohydric alcohol esters or modified lower alcohol esters of any of the aforementioned rosins, for example, the esters of alcohols having four or less carbon atoms, are equivalent to any of these rosins in the preparation of the conjoint condensation product, which is esterified to produce the resin employed in the preparation of the coating compositions of this invention.

These reaction products may be prepared from any aldehyde in place of the formaldehyde shown in Example 1. Thus, there may be used formaldehyde in any of its other modifications as anhydrous formaldehyde, acetaldehyde, propionaldehyde, butyraldehyde, furfural, benzaldehyde, aldols, etc. Also, any alpha, beta-unsaturated polycarboxylic acid may be employed in preparing the reaction products which are used in the making of the improved coating compositions. Hence, in place of the maleic anhydride employed in Example 1, there may be used maleic acid, fumaric acid, itaconic acid, citraconic acid, etc., and acids which decompose under the reaction conditions to produce an alpha, beta-unsaturated polycarboxylic acid, such as malic acid. Methods for the preparation of the reaction product of a polyhydric alcohol and a conjoint condensation product of a rosin, an aldehyde, and an alpha, beta-unsaturated acid are described in greater detail in my application, Serial No. 413,471, referred to before in this specification.

Any of the usual drying or semidrying oils may be used in the preparation of the coating compositions. In the examples, linseed and dehydrated castor oils are shown, but in their place there may be employed tung oil, soybean oil, perilla oil, fish oil, rapeseed oil, hempseed oil, walnut oils, fishoil dimer, fractionated fish oil triglyceride, oiticica oil, etc. While any of these oils may be used in the raw state, it is highly desirable that all of them except tung oil be prebodied according to procedures well known in the art. The amount of oil which may be used may vary from about 2 to about 100 gallons of oil per 100 pounds of resin, but preferably from about 5 to about 60 gallons of oil per 100 pounds of resin is used.

After the varnish base has been cooked to provide a composition having the proper body, it may be permitted to cool and then thinned with a solvent. In general, the varnish base is allowed to cool to 400–500° F. before the solvent is added, but the solvent may be added at other temperatures. In the examples, the varnish base was thinned with mineral spirits, but in its place there may be used any of the usual varnish thinners, such as the paraffin hydrocarbons as heptane, V. M. & P. naphtha, turpentine, etc., the coal tar hydrocarbons as benzene, toluene, xylene, etc., decahydronaphthalene, tetrahydronaphthalene, Solvesso No. 1, 2, 3, 4, etc. In the examples, the coating composition contained 50% solids. The amount of solids which the coating composition may contain will depend upon the viscosity desired in the final mixture and upon other factors. Generally, the finished coating composition will contain from about 20 to about 75% of solids, and preferably from about 35 to about 60%.

Metal oxides and salts, such as litharge, cobalt acetate, manganese dioxide, lead acetate, etc., may be added to the varnish as driers during the heating of the resin and oil, according to methods well known in the art. The driers may also be added as soluble naphthenates or resinates to the varnish after it has reached room temperature. When the varnish is to be used as an air drying finish, the drier content should amount to from 0.0 to about 1.0% lead, 0.0 to about 1.0% calcium, from about 0.01 to about 0.1% cobalt, and from about 0.0 to 0.1% manganese, all based upon the oil content of the varnish, and a drier composition of 0.2% calcium, 0.1% lead, and 0.07% cobalt, based upon the oil content of the varnish, gives very desirable drying properties. For baking finishes, the amount of drier may be reduced considerably and will normally be less than about 0.1% calcium, less than 0.1% lead, and about 0.005 to about 0.07% cobalt, based on the oil content of the varnish. These amounts of driers are given merely as approximations, and should in no way be construed as limiting the scope and applicability of the invention. If desired, the usual pigments may be added to the coating composition to produce an enamel.

The coating compositions prepared as described in the specification may be made in a very short kettling period and dry in a short time to form a hard enduring film. These compositions find general use wherever clear varnish and enamels have heretofore been employed.

This application is a continuation-in-part of my application, Serial No. 413,479, filed October 3, 1941, now U. S. Patent 2,331,805, and entitled "Synthetic resin and process of producing the same."

What I claim and desire to protect by Letters Patent is:

1. A coating composition comprising a material selected from the group consisting of drying oils and semidrying oils and a reaction product of a polyhydric alcohol and a conjoint condensation product of the simultaneous reaction of reactants consisting essentially of a rosin compound selected from the group consisting of rosin acids and lower monohydric alcohol esters thereof, an aldehyde, and an alpha, beta-unsaturated polycarboxylic acid.

2. A coating composition comprising a solvent, a material selected from the group consisting of drying oils and semidrying oils and a reaction product of a polyhydric alcohol and a conjoint condensation product of the simultaneous reaction of reactants consisting essentially of a rosin compound selected from the group consisting of rosin acids and lower monohydric alcohol esters thereof, an aldehyde, an an alpha, beta-unsaturated polycarboxylic acid.

3. A coating composition comprising a solvent, a material selected from the group consisting of drying oils and semidrying oils and a reaction product of a polyhydric alcohol and a conjoint condensation product of the simultaneous reaction of reactants consisting essentially of polymerized rosin, an aldehyde, and an alpha, beta-unsaturated polycarboxylic acid.

4. A coating composition comprising a solvent, a material selected from the group consisting of drying oils and semidrying oils and a reaction product of a polyhydric alcohol and a conjoint condensation product of the simultaneous reaction of reactants consisting essentially of partially hydrogenated rosin, an aldehyde, and an alpha, beta-unsaturated polycarboxylic acid.

5. A coating composition comprising a solvent, a material selected from the group consisting of drying oils and semidrying oils and a reaction product of a polyhydric alcohol and a conjoint condensation product of the simultaneous reaction of reactants consisting essentially of isomerized rosin, an aldehyde, and an alpha, beta-unsaturated polycarboxylic acid.

6. A coating composition comprising a solvent, a material selected from the group consisting of drying oils and semidrying oils and a reaction product of glycerol and a conjoint condensation product of the simultaneous reaction of reactants consisting essentially of polymerized rosin, an aldehyde, and an alpha, beta-unsaturated polycarboxylic acid.

7. A coating composition comprising a solvent, a material selected from the group consisting of drying oils and semidrying oils and a reaction product of glycerol and a conjoint condensation product of the simultaneous reaction of reactants consisting essentially of partially hydrogenated rosin, an aldehyde, and an alpha, beta-unsaturated polycarboxylic acid.

8. A coating composition comprising a solvent, a material selected from the group consisting of drying oils and semidrying oils and a reaction product of glycerol and a conjoint condensation product of the simultaneous reaction of reactants consisting essentially of isomerized rosin, an aldehyde, an an alpha, beta-unsaturated polycarboxylic acid.

9. A coating composition comprising a solvent, a material selected from the group consisting of drying oils and semidrying oils and a reaction product of glycerol and a conjoint condensation product of the simultaneous reaction of reactants consisting essentially of polymerized rosin, formaldehyde, and maleic anhydride.

10. A coating composition comprising a solvent, a material selected from the group consisting of drying oils and semidrying oils and a reaction product of glycerol and a conjoint condensation product of the simultaneous reaction of reactants consisting essentially of partially hydrogenated rosin, formaldehyde, and maleic anhydride.

11. A coating composition comprising a solvent, a material selected from the group consisting of drying oils and semidrying oils and a reaction product of glycerol and a conjoint condensation product of the simultaneous reaction of reactants consisting essentially of isomerized rosin, formaldehyde, and maleic anhydride.

12. A coating composition comprising mineral spirits, a material selected from the group consisting of drying oils and semidrying oils and a reaction product of glycerol and a conjoint condensation product of the simultaneous reaction of reactants consisting essentially of polymerized rosin, formaldehyde, and maleic anhydride.

13. A coating composition comprising mineral spirits, a material selected from the group consisting of drying oils and semidrying oils and a reaction product of glycerol and a conjoint condensation product of the simultaneous reaction of reactants consisting essentially of partially hydrogenated rosin, formaldehyde, and maleic anhydride.

14. A coating composition comprising mineral spirits, a material selected from the group consisting of drying oils and semidrying oils and a reaction product of glycerol and a conjoint condensation product of the simultaneous reaction of reactants consisting essentially of isomerized rosin, formaldehyde, and maleic anhydride.

15. A coating composition comprising mineral spirits, a drier, a material selected from the group consisting of drying oils and semidrying oils and a reaction product of glycerol and a conjoint condensation product of the simultaneous reaction of reactants consisting essentially of polymerized rosin, formaldehyde, and maleic anhydride.

16. A coating composition comprising mineral spirits, a drier, a material selected from the group consisting of drying oils and semidrying oils and a reaction product of glycerol and a conjoint condensation product of the simultaneous reaction of reactants consisting essentially of hydrogenated rosin, formaldehyde, and maleic anhydride.

17. A coating composition comprising mineral spirits, a drier, a material selected from the group consisting of drying oils and semidrying oils and a reaction product of glycerol and a conjoint condensation product of the simultaneous reaction of reactants consisting essentially of isomerized rosin, formaldehyde, and maleic anhydride.

18. The method of producing a coating composition which comprises heating together a material selected from the group consisting of drying oils and semidrying oils and a reaction product of a polyhydric alcohol and a conjoint condensation product of the simultaneous reaction of reactants consisting essentially of a rosin compound selected from the group consisting of rosin acids and lower monohydric alcohol esters thereof, an aldehyde, and an alpha, beta-unsaturated polycarboxylic acid at a temperature between about 500° F. and about 620° F.

19. The method of producing a coating composition which comprises heating together a material slected from the group consisting of drying oils and semidrying oils and a reaction product of a polyhydric alcohol and a conjoint condensation product of the simultaneous reaction of reactants consisting essentially of polymerized rosin, an aldehyde, and an alpha, beta-unsaturated polycarboxylic acid at a temperature between about 500° F. and about 620° F.

20. The method of producing a coating composition which comprises heating together a material selected from the group consisting of drying oils and semidrying oils and a reaction product of a polyhydric alcohol and a conjoint condensation product of the simultaneous reaction of reactants consisting essentially of partially hydrogenated rosin, an aldehyde, and an alpha, beta-unsaturated polycarboxylic acid at a temperature between about 500° F. and about 620° F.

PAUL H. SCRUTCHFIELD.